United States Patent Office 3,513,081
Patented May 19, 1970

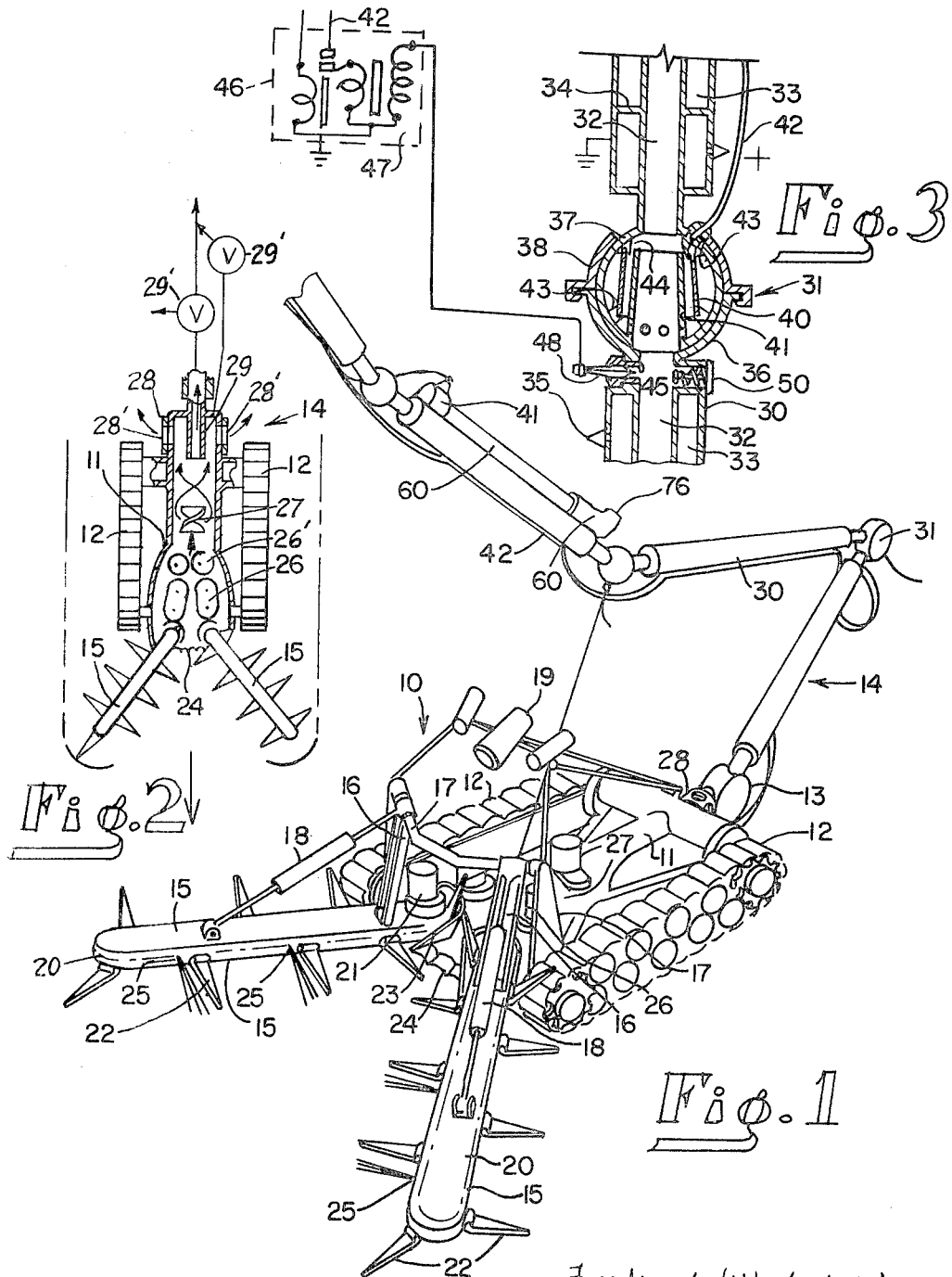

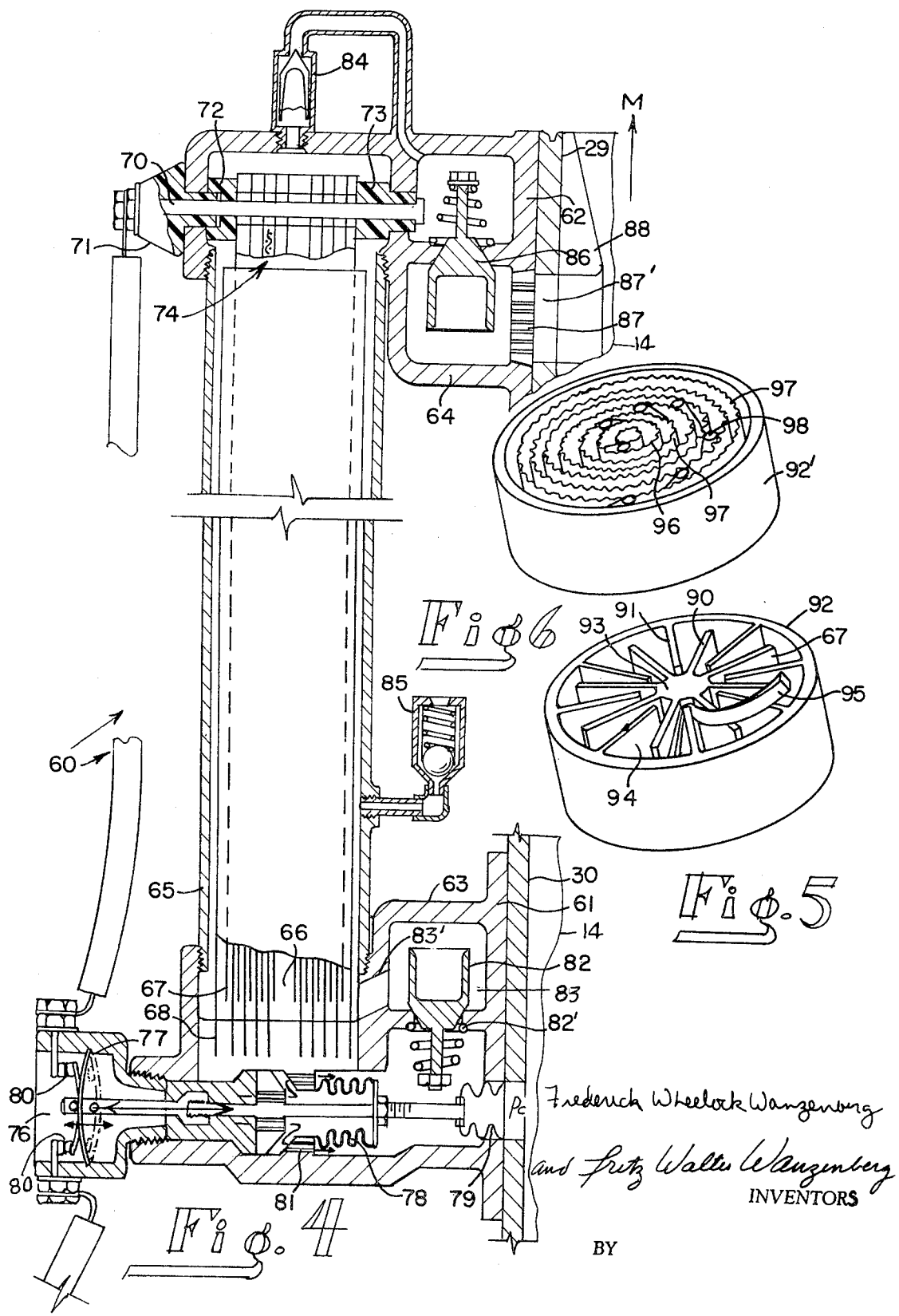

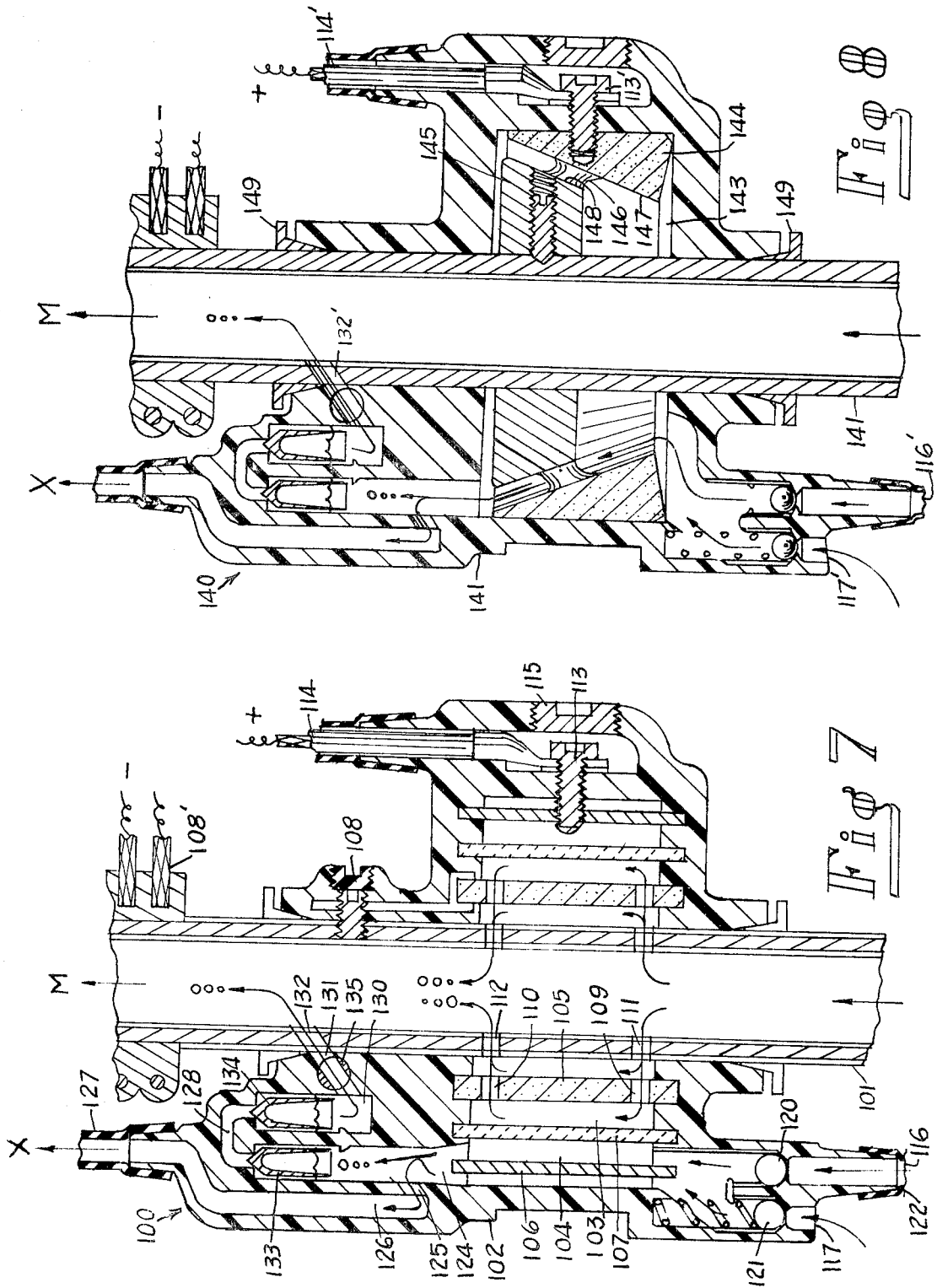

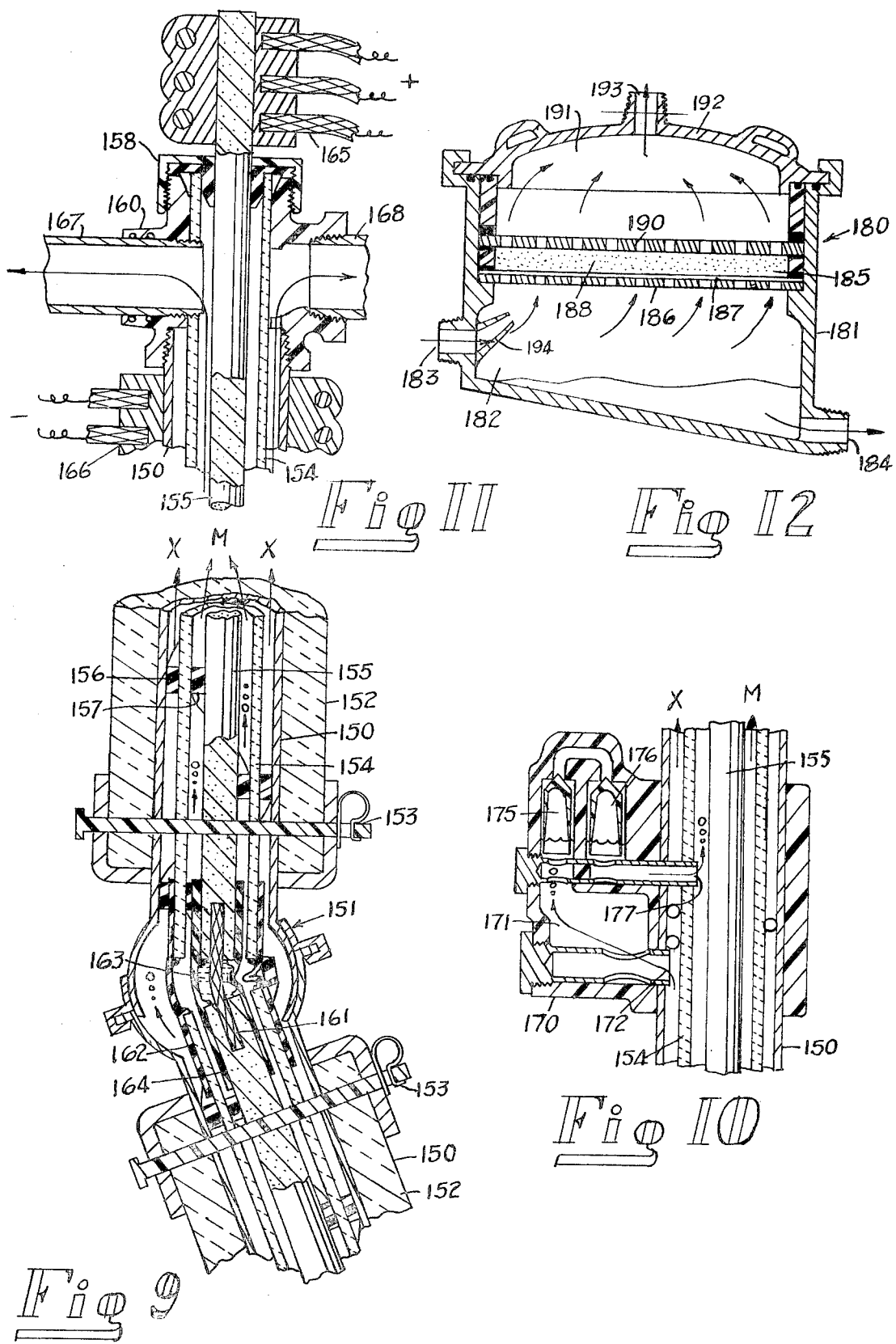

3,513,081
DEEP SEA MINING SYSTEM USING
BUOYANT CONDUIT
Frederick Wheelock Wanzenberg (Box 2809 76 College of Wooster, Wooster, Ohio 44691), and Fritz Walter Wanzenberg, 9 Campbell Lane, Larchmont, N.Y. 10538
Continuation-in-part of application Ser. No. 537,609, Mar. 16, 1966. This application Jan. 27, 1969, Ser. No. 794,156
Int. Cl. B01k 1/00, 3/00
U.S. Cl. 204—130                               29 Claims

ABSTRACT OF THE DISCLOSURE

A system for recovering minerals and mineral bearing ore materials from underwater deposits in the sea, lakes, rivers, etc. wherein collecting apparatus in vehicular form is provided for moving along the bottom surface in deep water areas which gathers mineral and/or mineral ore bearing sediment into the vehicle where it is reduced to small size and delivered into a conduit leading to the surface, with the conduit having associated devices for electrolysis of the surrounding liquid to produce hydrogen gas and other products for propelling the collected material to the surface and for oxidizing the metal and metal components of the ores into soluble forms so that the metal and metal solutes may be separated from the gangue, generally with supplemental surface equipment, and the gangue returned to the general area from which it has been taken.

This application is a continuation-in-part of application Ser. No. 537,609, now abandoned, filed Mar. 16, 1966.

This invention relates to the recovery of metals and mineral compounds from oceans, lakes, rivers and like areas, and is more particularly concerned with improvements in methods and apparatus for collecting alluvial or sedimentory deposits of mineral bearing materials in underwater areas and for bringing such materials to the surface in a condition which facilitates recovery of the mineral content.

The mining systems and apparatus heretofore employed in removing minerals and mineral bearing materials which are deposited at the bottom of the sea, or in other underwater locations, has involved the use of dredging, dragline or bucket conveyors or similar equipment which has limited such operations generally to relatively shallow water locations. Operations at substantially deep water, locations have, for the most part, been considered impractical because no system or equipment has been readily available for successful deep water operation at a cost considered economical. It is an object, therefore, of the present invention to provide a unique mining system for collecting underwater mineral and ore deposits which can be economically operated for recovery of the valuable components of materials in waters of far greater depth than heretofore considered possible with the use of any previously available equipment.

It is a more specific object of the invention to provide a system and apparatus for use in collecting or recovering metals and mineral compounds which have been deposited on the bottom of oceans, lakes and rivers and conveying such materials to the surface, which employs a buoyant conduit wherein the material, mixed with water, is propelled to the surface by gases, creating a light, differential column with respect to the water surrounding the conduit, thereby providing a significant differential pressure head for forcing the mixture of water, gas and solid material to the surface.

It has a further object of the invention to provide a method and apparatus for collecting metals and mineral compounds which are located on oceans, lake and river bottoms and conveying such materials to the surface, wherein the materials are collected and crushed to predetermined fineness by apparatus adapted to rest on the bottom of the water covered area, and fed into the mouth of an articulated conduit after crushing and removing sand and shells and leaving them on the bottom so that the latter or waste materials will not enter the system, which conduit leads to the surface and which comprises associated means for generating, from the available liquid surrounding the conduit, chemical compounds which are utilized to propel the material upwardly in the conduit.

It is another object of the invention to provide for use in conjunction with an apparauts for collecting minerals and mineral bearing ore materials from the bottom of the ocean or other relatively deep water areas, an articulated conduit for raising the collected material to the surface, which conduit has associated with it a means for utilizing the liquid surrounding the conduit, through the generation, by electrolysis or electric arc, of gases, particularly, hydrogen, chlorine, fluorine and hydroxides, when the liquid is sea water, with the conversion of the sea water into the desired components being effected along the length of the conduit and the gaseous products being effective to supply pressure for vertical ascent of the collected material.

A further object of the invention is to provide a system and apparatus for the purpose described wherein the conduit has associated means for supplying gases from the liquid surrounding the conduit which will operate as propellants for the column of material being conveyed in the conduit and which will also act on the ore in the column of material to oxidize and make soluble mineral components thereof during its conveyance so that the mineral components which are fed into the lower reaches of the conduit in insoluble condition will reach the surface as dissolved metal (simple) and mineral (complex) soluble ions which can then be reduced, or chemically precipitated from solution as metals and metal compounds (generally oxides and hydroxides), washed, roasted and refined into metal ingots. Where water depth is not great enough to permit total oxidation of insoluble mineral ore components and complete metal recovery, supplemental facilities can be provided at the surface to complete this process.

Another object of the invention is to use closed circuit television, with or without tracers or dyes, to control and regulate the operation of the ocean floor portion of the system, passively by dragging the material collecting unit over the ocean floor, or actively, by self-propulsion of such unit, using electrical or hydraulic power for operating lugged wheels or tracks on the unit for traction and steering.

Still another object of the invention is to provide a conduit for the purpose described wherein provisions are made for exploding excess gases generated, particularly, in the upper reaches of the conduit, where the greatly expanded gases are no longer needed to lighten the column of conveyed material, and with associated means for collecting propellant gases when they reach the surface so that they may be utilized for the preparation of reagents for surface plant use or for other purposes, such as, for example, driving a turbine or for steam generation to obtain power or heat which can be utilized in operating the system.

These and other objects and advantages of the invention will be apparent from the system for recovering minerals and mineral deposits from the sea or other underwater locations and the several forms of apparatus therefor which are shown by way of illustration in the accompanying drawings wherein:

FIG. 1 is a perspective view showing apparatus for collecting minerals and mineral bearing sediment from the bottom of the sea or other underwater location, for crushing the material and for delivering it into a conduit for conveyance to the water surface, which apparatus embodies features of the invention;

FIG. 2 is a plan view, largely schematic and to a smaller scale, of the apparatus of FIG. 1;

FIG. 3 is a sectional view to a larger scale, of a portion of the material conveying conduit of FIG. 1 with an integral arc decomposition device;

FIG. 4 is a sectional view to an enlarged scale and with portions broken away, of an automatic electrode plate decomposition unit which is adapted to be mounted on the material conveying unit;

FIG. 5 is a fragmentary perspective view showing a section of a modified form of the electrode plate decomposition unit;

FIG. 6 is a fragmentary perspective view showing a section of a further modified form of the electrode plate decomposition unit;

FIG. 7 is a cross-sectional view of an automatic in-line electrode plate type decomposition and ore oxidation unit which embodies separate anode and cathode chambers and separate conduits for the anode and cathode decomposition products;

FIG. 8 is a cross-sectional view similar to FIG. 7, showing an in-line arc type decomposition unit;

FIG. 9 is a cross-sectional view of a modified ore conveying and oxidizing conduit which embodies an integral, continuous electrode type decomposition and ore oxidation apparatus;

FIG. 10 is a cross-sectional view of a hydrogen by-pass device for use with the apparatus of FIG. 9;

FIG. 11 is a cross-sectional view of a top terminal apparatus for use with the apparatus of FIG. 9;

Figure 13:
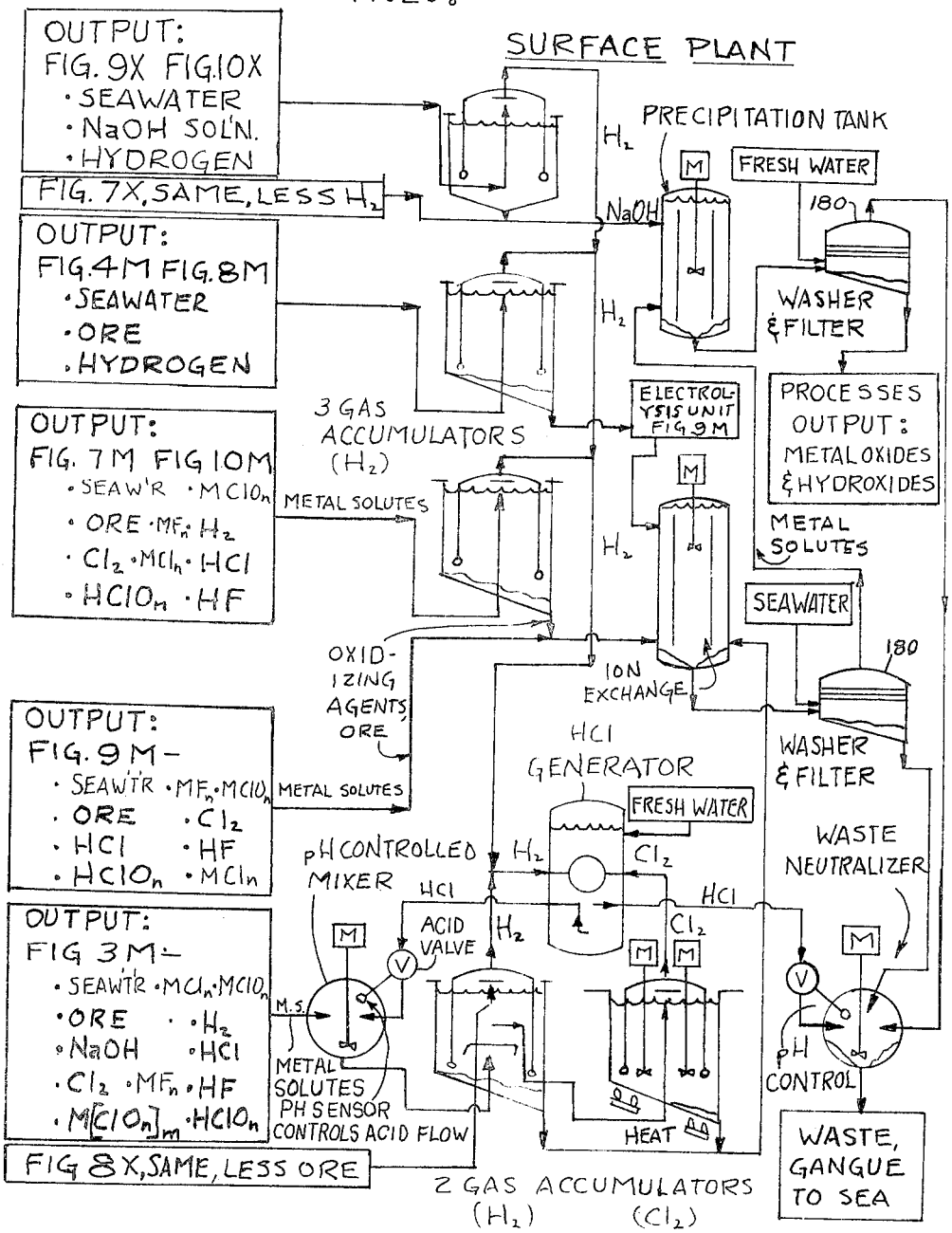

FIG. 12 is a cross-sectional view of a differential pressure inversion filter adapted to be used with the apparatus for liquid-solid separation; and FIG. 13 is flow chart showing a surface process designed for recovering minerals and mineral compounds from the materials delivered by the various forms of the ore conveying and oxidizing conduits and associated apparatus, illustrated in FIGS. 1 to 12.

Referring first to FIGS. 1 to 3, there is illustrated an apparatus embodying the invention which is adapted to collect ore in the form of sediment from the ocean floor, the bottom of a lake, or the like, and to crush the ore and transport the crushed ore to a ship or other surface support for processing so as to recover the mineral content of the ore.

The ore collecting apparatus 10 (FIG. 1), which is vehicular in form, comprises a hollow frame or housing 11 mounted between supporting caterpillar tracks 12 of conventional construction with track driving motors at the trailing end of the housing 11 in a suitable compartment, indicated at 13, the motors being connected, by suitable gear, or chain and sprocket means, in driving relation with the tracks 12 so as to drive the two tracks simultaneously, or separately both forward and in reverse, enabling the driving motors to advance, through control cables preferably housed in the ore transporting and service conduit 14, the ore collecting vehicle 10 and to also guide the same over the area in which it has been determined there are mineral bearing deposits.

Collector arms 15 are hingedly mounted at the forward end of the housing 11 on hinge brackets 16 depending from a top cross frame member 17 with automatically equalizing spring or hydraulic brace-like support units 18 which hold the arms 15 on the ocean floor regardless of grade changes or surface irregularities. The support units 18 are basically spring or weight loaded and serve as dashpots to permit slow raising and lowering so as to accommodate changes in grade and to maintain constant pressure on the surface over which the apparatus is driven. Where television navigation is employed active hydraulic systems are contemplated for raising and lowering the arms with a self-contained hydraulic sub-system controlled from the ship or other surface unit, the hydraulic fluid being fed in a suitable manner through the service conduit 14. The collector arms 15 each house an endless chain, indicated at 20, which is mounted on suitable end sprockets and driven by a motor indicated at 21, which is supplied with power and controlled through cables in the service conduit 14. A series of radially extending, hingedly mounted collector teeth 22 are supported on the chain 20 so as to travel in a path about the perimeter of each collector arm 15. A cam track 23 at the hinged end of each arm 15 diverts or deflects the material gathering collector teeth 22 upwardly so as to clear the housing 11 and to throw the material into the mouth forming opening 24 at the forward end of the housing 11. The tooth connections with the supporting chain 20 include torsion springs and limit stops which may be adjusted so as to vary the tooth bite into the surface over which they travel. Also, the tooth bite may be adjusted by varying the speed with which they travel and/or varying the pressure exerted on the collector arms 15 by the support units 18. At low speeds the teeth 22 will collect deposits to a depth equal to the tooth profile which is sufficient for recovery of sediments of alluvial or "reduced" ores. It is found that most nodules are only slightly embedded in the silt or sand, so that preparation of grade, such as silt removal, is not necessary. However, where required the nodular matrix may be eroded by equipping the arms with nozzles, indicated at 25, and supplying liquid through high pressure pumps and suitable connecting lines.

Constricting, differentially actuated, chain or cog belts, indicated at 26 in FIG. 2, are provided within the housing 11 for receiving the material fed through the opening 24 to effect primary crushing of the ore. The belts 26 are motor driven at different speeds at the same center feed direction or one reversed (faster) and one forward (slower) moving, not only crushing the nodules or ore particles as they are advanced toward the path constricting end but grinding the same by the differential or contra-directional movement at the belt interfaces, the net speed differential being such as to draw particles into the apparatus.

A secondary crusher, indicated at 27 in FIG. 2, is associated with the primary crushing apparatus 26, which is in the form of a motor driven, high speed roller system using differential rotational speeds and also using the inertial mass of the wheels themselves to further crush the nodules and ore by impact. The wheels comprise relatively heavy rims having balanced compression springs for spokes so that the heavy rims and the resistance to compression of the springs will apply force to oversize particles being crushed and after impact the wheels will recenter to rebalance themselves. The crushing wheels 27 receive the particles from the constricted end of the primary crushing belts 26 and reduce the same to a size which will not clog the conduit 14 through which the material is conveyed to the surface.

The crushed material advances from the crushing wheels 26' to a fixed screw spiral cyclone separator chamber indicated at 27 in FIG. 2 which causes centrifugal flow of sand and shell particles away from center and directs the same to a discharge area where automatically operated sleeve valve 28 controls openings 28' for discharge of sand and shells from the ore mixture. The water and ore mixture passes through vortex finder 29 for removal of fine waste particles and into the conduit 14 where two successive two-way valves 29' are provided for proportioning the heavy and fine particles, the first valve 29' being open for fine particles and the second valve 29' being open for coarse particles. Both valves 29' and the sleeve valve 28 open for proportional coarse-to-fine intake as well as sand and shell disposal to the sea. The sleeve valve 28 may be completely closed or adjusted to provide small or large discharge openings. When sleeve valve 28 is not needed the two valves 29' control acceptance or disposal of particles. Removal of gangue before entry to system in this manner is comparable to the overburden and low grade waste removal to produce throughput practiced in land mining operations.

The ore transporting and service conduit 14 (FIGS. 1 and 2) which connects the collecting apparatus 10 with the surface equipment and also serves to convey the collected ore materials to the surface, comprises a series of articulated link members 30 connected by ball and socket joint arrangements 31. Each link member 30 has an axially extending material accommodating passageway 32 surrounded by an air chamber 33, which is preferably compartmentalized by frequent bulkheads 34 in FIG. 3, and which is adapted to be filled with high pressure gas through valves 35 in FIG. 3, so as to give the conduit 14 a built-in buoyancy and reduce the weight to the point where relatively small ships are sufficient for surface support and control purposes. The ball and socket joint 31 comprises the ball socket 36, which is integral with one link 30, for receiving the ball 37 which is integral with the next adjacent link 30, and a quick locking retainer clamp 38, so as to flexibly couple the articulated links 30 into a conduit chain. The conduit 14 provides a passageway 32 for conveying the ore material to the surface and also may serve to accommodate the power supply and control cables for the electrical equipment associated with or mounted on the vehicle 10, or alternately, power and control cables may be attached exteriorly to the conduit 14. It may also be utilized to house or support fluid supply lines as hereinafter referred to. Sealing the ball joints 31 does not appear to be necessary since the differential pressure at any point where use is contemplated will not be excessive and leakage of sea water will be small in volume compared to the rate of flow of fluid, gas and ore to the surface. However, clearances are made small and a viscous ball joint lubricant may be used if found desirable.

The ball and socket joints 31 each house an insulated tubular arc electrode 40, usually of graphite, working in conjunction with a grounded arc electrode 41, usually of steel, which serves as the cathode, when operating on direct current, to decompose water by electrolysis and to liberate gases from chemical compounds in solution. A power supply cable 42 is connected to the tubular anode 40 which is mounted within the ball joint 31 on insulator supports 43, spaced about the periphery at the ends of the anode tube 40. The insulators 43 keep the ungrounded "arc" electrode 40 insulated yet permit free passage of fluid, aggregate and gases. The inner "arc" electrode 41, which constitutes the cathode, is tapered in the direction of flow so that the chamber so formed acts as a venturi, creating suction at the smaller upper end at 44, which continually cleans the electrode interspaces. The electrode 41 has entry holes 45 at the base for fluid, as shown, recessed slightly, so the inertia of solid particles will carry the same past the holes 45. This "arc" arrangement provides, by electrolysis and decomposition of water and entrained fluids, both gases for propelling the material in the conduit and gasses and chemicals for oxidation of mineral ore components in the conduit, i.e., to dissolve them to conduit solutes, as hereinafter described.

Because gases expand greatly in coming from great depths to the surface, while concurrently also coming out of solution with the conduit fluids, it is necessary to "degas" periodically in the upper reaches of the conduit when operating in deep water. This is done using spark ignition, out of time phase, so that no continuous explosion—and subsequent continuous implosion takes place. The power supply line 42 is connected to a timing switch 46, indicated diagrammatically in FIG. 3, to make and break the primary current of an induction coil 47 so as to provide a spark at 48 which will cause both hydrogen and oxygen as well as hydrogen and chlorine to explode violently, producing steam in the first instance and hydrochloric gas in the second. The succeeding implosion, whether slow or rapid, will occur when the steam condenses and the hydrochloric gas goes into solution with the conduit fluids to form a hydrochloric acid solution. As a precaution against rupturing the conduit or generating high transient pressure surges in the conduit during explosion of gases following ignition, check valves 50 (FIG. 3) are incorporated in each length of conduit permitting the high pressure to vent itself by escaping to the sea, at the same time not permitting the sea to enter the conduit under normal conditions.

Another source of gas for increasing the buoyancy of the conduit 14 and the column of fluids, solids and gases in the conduit, so as to provide high velocity retrieval of the conduit contents to the surface, is illustrated in FIG. 4. The electrolysis unit 60 which is adapted to be mounted on the exterior of a conduit link unit 30, as shown in FIG. 1, is designed for the decomposition of sea water, or fresh water with a dilute solution being formed from the fluids and solutes entering the unit 60. The unit 60 is attached to or mounted on the conduit link 30 by means of flange members 61 and 62 on combination end brackets and housings 63 and 65 between which there extends a tubular member 65 forming an electrolysis chamber 66 in which electrodes 67 and 68 (grounded) are mounted. A connector 70 is mounted in the manifold forming upper end bracket 64 by means of insulators 71, 72 and 73 and connected by a suitable line to a direct or alternating current source so as to apply a nongrounded voltage to the electrodes 67. Electrode spacing is maintained by non-conducting spacers 74 of plastic screen. An entrance at 76 is provided in the lower manifold forming bracket 63 through which sea water enters and travels through the outer hole cluster in a throttling valve stem member 77 which moves axially, to the right in FIG. 4, against reaction of bellows 78 and 79 when high differential pressure or high velocity flow is encountered, shutting off flow and opening the electrical circuit to the electrolysis unit. At low pressure differentials and/or low flow velocities, the electrical contacts 80 close (solid line position in FIG. 4) and the salt water or fresh water and electrolyte solution continue to flow through holes in the valve seat member 81 and then continue through the bell-shaped check valve 82 and opening 82' into the chamber 83 and then through opening 83' into the electrolysis chamber 66. When electrolysis begins the water check valve 84 in the upper manifold 64 is closed. It will open when sufficient gas has been generated to saturate the liquid for that pressure and temperature and also create enough free gas to force liquid out of valve opening 85 to the sea and fill the chamber of check valve 84 with gas. Gas will then be released through the valve 86 in the upper manifold 64 and pass through the strainer 87, the opening 87' in the wall of conduit link member 30, the venturi 88, and into the axial passageway for the column of material in the conduit 14. The venturi 88 at the opening 87' will create a low pressure zone to keep solids away and to help scavenge gases from the electrolysis unit.

The electrolysis apparatus of FIG. 4 employs parallel, spaced, electrode plates forming anode 67 and cathode 68 which are mounted in the housing 65, the latter forming the electrolysis chamber 66. In FIG. 5, an alternative electrode arrangement is illustrated wherein radially disposed electrodes 90 and 91 are supported on a cylindrical housing 92 and a center connector post 93 with the housing 92 enclosing the electrolysis chamber 94 and with the electrodes separated or spaced by a continuous insulator 95 spirally wound from the bottom to the top of the electrodes so that fluids and gases may rise in the interspace between successive insulation strands of helixes.

In FIG. 6, a further alternative electrode arrangement is illustrated wherein the anode 96 and cathode 97 are in the form of concentric, corrugated tubes, alternately, anodes and cathodes from the center out with the cathode grounded to the housing 92'. Insulators 98 are employed in multiple, one between each anode-cathode pair 96, 97, which insulators are helically wound so as to permit ascent of fluids, gases, solutes and small particles.

The voltage required to effect electrolysis of the sea water has been found to be almost independent of the water pressure and to be primarily dependent upon electrolytic resistance and electrode spacing. Voltages of 1.26 to 2.00, which are satisfactory at the surface, can be used successfully at substantial depths. However, when in deep water, a larger overvoltage, in the neighborhood of 20 volts is desirable for more efficient gas generation, though smaller voltage could be used. When electrolysis is by use of the arc electrodes, more efficient gas generation is generally found possible but higher start-up voltage is usually required.

The conduit system is designed to utilize to the best advantage the products of the environment in which it is operated, for efficient and economical handling of the ore material and subsequent recovery of the mineral content thereof. The solubility characteristic of the gases which can be obtained by electrolysis of seat water, such as hydrogen, oxygen and chlorine, varies directly with pressure. For example, at 20,000 feet water depth, the pressure is approximately 580 times atmospheric pressure so that hydrogen, chlorine and oxygen gases could be expected to dissolve at 580 times their solubility at the surface. When these gases are formed by electrolysis or arc decomposition of the sea water at relatively great depths where, due to pressure, they are in solution, and the gas laden liquids rise in the conduit, some of the dissolved gases will be liberated as the pressure of the column decreases to form a significant deferential head between the conduit media and the outside sea media.

Gases generated by the electrolysis of sea water comprise primarily hydrogen at the cathode and chlorine, oxygen and fluorine at the anode. In addition to these gases which are formed, the ions of sodium, ($Na^+$), and potassium ($K^+$), (and to a lesser extent $Cs^+$, $Rb^+$, $Li^+$, because they are less abundant), are attracted to the cathode where they remain in solution balance with the hydroxyl ($OH^-$) ion as hydroxide solutions, chiefly ($NA^+ + OH^-$) and ($K^+ + OH^-$) here also the residual $H^+$ ions are reduced to $H_2$ gas at the cathode.

Hydrogen is formed in abundance at the cathode, is only slightly soluble in water and has a very flat temperature and pressure solubility curve. Hydrogen is therefore the best of the gases formed for utilization as a propellant gas in the conduit. Hydrogen is less reactive as a reducing agent than chlorine is as an oxidizing agent at pressures and temperatures encountered in the conduit so that hydrogen performs well as a propellant, yet does not interfere significantly with the desired net oxidation of ore components within the conduit. Hydrogen is a product of all the electrolytic devices contemplated. To fully utilize the hydrogen produced in the conduit as well as that produced subsequently on the surface, it is blended with chlorine to produce hydrochloric acid (HCl) gas, quickly, by "combustion," or more slowly, in a catalytic chamber.

The resulting HCl in water solution is used to neutralize the NaOH in some conduit liquids and to reduce the pH of waste liquids to pH 7 prior to disposal at sea. Excess hydrogen may be used later in roasting, where metal oxides and hydroxides are reduced to metal powders prior to smelting and/or refining.

Oxygen is formed sparingly at the anode in the electrolysis of sea water. The high concentration of the chloride ion $Cl^-$ in sea water compared to the oxygen ion ($O^-$) concentration, despite oxidation potentials for each, produces from seat water about 100 times more $Cl_2$ at the anode than $O_2$. Oxygen therefore need not be considered either as a propellant or as an oxidizing agent. It performs its best function in the system in supplying oxygen to the strong oxidizing complex ions, $ClO_n$ needed in the oxidation process, whether derived from basic conduit solutions, such as, from $NaClO_n$ or $KClO_n$ or in acid conduit solutions, such as, from $HClO_n$. ($n$ has any value from 1 through 4).

Chlorine is formed in abundance at the anode but unlike hydrogen, it is very soluble in water, for example, it will be completely dissolved in water as gaseous chlorine ($Cl_2$) below a depth of approximately 90 feet. Chlorine is about 8,000 times (by weight) more soluble in water than hydrogen, therefore, it cannot be considered seriously as a propellant at great depths. Chlorine, however, is a most effective oxidizing agent. Moreover it reacts with sea water components to form other oxidizing agents. Thus, half of the gaseous chlorine exists as $Cl_2$ in water solution, a quarter as hydrochloric acid (HCl), and a quarter as hypochlorous acid (HClO). Moreover, the effect of electrolysis, acidity and heat in the conduit generates the $HClO_n$ acids including perchloric acid ($HClO_4$) all excellent oxidizing agents. Chlorine is recovered at the surface mostly as solution chlorine with a small amount of free chlorine. It is captured by the apparatus shown in FIG. 3 and other forms of the electrolysis apparatus herein after referred to, and performs its oxidizing function on the ore which is present immediately. The chlorine coming to the surface from the conduit is evaporated and "beaten" out of solution so that it may be united with hydrogen in a hydrochloric acid (HCl) generator. Most of the chlorine has oxidized insoluble mineral ore components into soluble simple and complex chlorides and chlorates, including the $ClO_n$ complexes, sodium and potassium chloroplatinates or chloroaurates, etc., in basic conduit solutions or chloroplatinic or chloroauric acids, etc., in acid conduit solutions.

Fluorine is perhaps the strongest common oxidizing agent known, having an oxidation potential in a 1 molar acid solution of $-2.8$ as compared with $-1.34$ for chlorine and $-1.63$ for both HClO and $HClO_2$. Fluorine is oxidized from solution at the anode to $F_2$ and reacts violently with water to form HF. Since its chief value as an oxidizing agent occurs when fluorine is in the F (nascent) or $F_2$ (gaseous) states, the HF must be oxidized in the conduit where the F and $F_2$ generated are in contact with the ore whose metal components can thus be oxidized to metallic ions in balance with $F^-$ ions. Where anodes are exposed to ore as well as to sea water solutions, as in FIG. 3, the fluorine generated can perform its oxidizing function. In this case the fluorine comes from two sources: the soluble fluorides, such as HF, in sea water solution, and the new insoluble fluorides in the ore components such as manganese difluoride ($MnF_2$) which may be present. HF also can be added to conduit solution.

The sodium hydroxide, or caustic soda (NaOH) which is generated at the cathode by the electrolysis of sea water is captured in the apparatus of FIG. 3. In that apparatus (and in the apparatus of FIG. 8, hereinafter described), the NaOH is partly neutralized by HCl generated by arc action in the same conduit. Where this mixture occurs, however, $KClO_n$, $NaClO_n$, $Ba(ClO_n)_2$, $Sr(ClO_n)_2$, $Ca(ClO_n)_2$ etc., are also generated thereby providing a generous quantity of $ClO_n^-$ ions which serve as excellent oxidizing agents to dissolve certain of the ore components. Their effect is partly lost if the then remaining NaOH is not completely neutralized, since such excess NaOH will precipitate the soluble metal ions to their oxides and hydroxides before we have safely removed such dissolved metal from the gangue. This is done in an ion exchange-accumulator (shown in FIG. 13) by feeding hydrochloric acid into it from an HCl generator. Since more acids net, than bases, will be generated mole for mole, it is likely that excessive HCl addition will be unnecessary. The HCl valve will, therefore, be monitored by a pH control. The NaOH may be kept isolated in a separate conduit in some forms of the apparatus (FIGS. 7, 9, 10 and 13) where it is conveyed to the surface and preserved for use as a precipitant in a precipitation tank (FIG. 13).

The conduit apparatus may be modified as illustrated in the several forms thereof which are shown in FIGS. 7 to 12. A form of the apparatus, similar to that shown in FIG. 3 and serving the same purpose, is illustrated in FIG. 7 wherein isolated plate electrolysis rather than exposed arc electrolysis, is employed. The anode and the anode products are kept isolated from the cathode and the cathode products. However, some or all of the gas generated at the cathode (Hydrogen) is injected into the main conveying passageway in the conduit to help convey the column of material therein. The apparatus 100 is mounted on a straight section 101 of the main conveyor conduit which may be the same construction as a link 30 (FIGS. 1 and 3). It comprises a housing 102, of non-conducting material, encompassing the conduit section 101, which has inside and outside insulating cover. The housing 102 is constructed to form anode and cathode chambers 103 and 104, respectively, in which a cylindrical anode 105 and a cylindrical cathode 106 are mounted with a chamber separating or isolating barrier 107 in the form of a tubular section of, for example, semi-permeable transite (asbestos) or a permeable "Teflon" membrane. The anode 105 is formed of graphite or other suitable material and is grounded, by connection with a stud 108 which in turn is grounded through the main conduit wall and grounding connections 108′. The anode 105 is perforated at 109 and 110, preferably, with the holes aligned with axially spaced holes 111 and 112 in the conduit section 101, so as to provide for passage through the anode chamber 103, which encompasses the main conduit passageway, of a portion of the water, gas and ore mixture rising in the conduit and the passage into the conduit through the upper holes 112 of the anode products, chiefly chlorine and oxidized, i.e. dissolved, ore minerals. The cathode 106 in the cathode chamber 104 which encompasses the barrier 107 is a stainless steel shell connected by stud 113 to an insulated cable 114 leading to a source of direct current. A plug 115 may be provided for access to the connection 113. A dual entrance to the cathode chamber 104 is provided at 116 and 117 in the bottom of the housing 102, guarded by check valves 120 and 121, with the entrance 116 connected by auxiliary conduit 122 running from a like unit at a lower point on the conduit 101, and the entrance 117 being open to the sea for entry of surrounding sea water when the pressure in the main conduit 101 and the auxiliary conduit 122 is lower than the surrounding sea pressure by an amount sufficient to result in the compression of the spring and opening of the valve 121. The cathode chamber 104 connects with an extension chamber 124 in the top of the housing 102, which has an opening 125 into a discharge passageway 126 connected by auxiliary conduit 127 with the next unit above the same and providing for upward flow of the cathode products to the next unit or to the surface. The extension chamber 124 is connected also by a passageway 128 with an adjoining chamber 130 in the housing 102 which in turn is connected by a rifling passageway 131 leading to an opening 132 in the main conduit 101. Cup valves 133 and 134 at the ends of passageway 128 prevent flow of liquid in either direction and permit passage of gas only and valve 135 is provided in the rifling 131 so that it may be closed in selected units to supply hydrogen propellant which is needed in the auxiliary conduit system. The hydrogen generated in the cathode chamber accumulates in the outboard check valve (133) void until it is no longer buoyed up by liquid and, if the inboard check valve (134) is also not buoyed up by reason of lower pressure in the main conduit the hydrogen will be injected into the main conduit 101 through the rifling 131 so long as the valve 135 is open. The discharge or upward flow of material in the main and auxiliary conduits is indicated at M and X, respectively, on FIG. 7.

The apparatus 140, which is illustrated in FIG. 8, corresponds closely in construction to the apparatus in FIG. 7 and the same numerals primed are employed to indicate elements of the same construction. The contents of the main and auxiliary conduits will be different, however. There is no electrode in this form of the apparatus which is exposed directly to the contents of the main conduit as in the apparatus of FIG. 7. The main conduit section 141 has an insulation cover inside but not outside. The housings 142 which is mounted on and encompasses the conduit section 141 is of insulation material and has an electrolysis chamber 143 in which two truncated cone-shaped electrodes 144 and 145 are mounted so as to produce an arc, indicated at 146, for gas generation between parallel tapered surfaces 147 and 148. The innermost cathode forming stainless steel electrode 145 is grounded to the outside wall of the conduit 141 and the outermost, anode forming, graphite electrode 144 is connected by stud 113′ with current cable 114′. The anode forming electrode 145 may be adjusted axially of the conduit so as to adjust the spacing between the faces 147 and 148 of the electrodes as these faces erode with use, by axially adjusting the housing 142 through repositioning of the wedges 149. Material is fed from a lower unit through entrance opening 116′ and sea water through opening 117′ in the same manner as in the apparatus of FIG. 7 while the only connection with the main conduit is the opening 132′ for the passage of gas generated in the chamber 143. The gases generated by the arc, when the electrodes are supplied with either D.C. or A.C. current, comprises chiefly hydrogen but also chlorine, oxygen, fluorine and gaseous products from the arc electrodes themselves. Free gases are fed into the main conduit 141 in the same manner as in the apparatus of FIG. 7. Typical main conduit and auxiliary conduit outputs or products are shown in the flow diagram of FIG. 13.

A conduit arrangement is illustrated in FIGS. 9 to 11 in which the main conduit wall or shell is employed as a continuous cathode forming electrode, with a continuous anode forming core member mounted in an inner axial chamber formed by mounting in concentric relation within the main conduit shell a continuous tubular barrier member of smaller diameter than the diameter of the main conduit member, which barrier member divides the conduit interior into two separate chambers for the anode and cathode products. The links 150 forming the main conduit are connected by ball and socket type joints 151 of substantially the same construction as the joints 31 of FIG. 3. To add buoyancy to the links 150 an outer jacket 152 of styrofoam may be clamped to the exterior wall by end clamps or cap members 153. A barrier in the form of a transite (asbestos) pipe 154 of smaller diameter than the inside diameter of the main conduit shell is mounted in concentric spaced relation within the conduit and a continuous anode forming carbon core 155 is mounted within the barrier pipe 154. The core 155 and pipe 154 are spaced or separated from each other and from the main conduit wall by spiral insulators 156 and 157 extending within the links 150 while at the topmost end an insulator cap 158 on a 4-way or T connector 160 of insulating material separates the anode core 155 and the tube 154 while the T connector 160 separates the tube 154 and spaces the same from the inside wall of the conduit member 150. The anode core 155 is in sections which are hingedly connected at the joints 151 by flexible braided wire connections 161 and flexible sleeve members 162 of rubber, or the like, with oil 163, or other suitable fluid, filling the empty space between the ends of the core sections. The barrier tube 154 is also in sections with flexible rubber sleeve connections 164 at the joints. The anode core has a cable 165 connection at the top and there is a cable connection 166 at the top of the main conduit shell for connection to a current supply for operation. The coupling 160 at the upper end provides conduit connections 167 and 168 for independently discharging the products from the anode and cathode chambers, respectively.

Hydrogen in gaseous form will be produced in the cathode chamber for propellant purposes in this form of the conduit and FIG. 10 shows an arrangement for transferring some of the propellant gas to the anode chamber. The housing 170 of insualtion material encircles the main conduit shell and provides chamber 171, which is connected through opening 172 with the cathode chamber, an upper extension chamber 173, and passageway 174, with two liquid checks 175 and 176 of the same character as checks 133 and 134 (FIG. 7), leading to gas discharge passageway 177 which extends through the main conduit shell and the barrier tube 154 and empties into the anode chamber.

A differential pressure inversion filter 180 is illustrated in FIG. 12 which is particularly designed for use with the propulsion-oxidation conduit and the surface apparatus which may be used with the same, the combination of all the apparatus contemplated being shown in the flow chart illustrated in FIG. 13. The filter device 180 comprises a housing 181 providing a lower intake chamber 182 with an intake opening 183 for receiving liquid-solid mixtures and a discharge opening 184 for discharging solids. A filter section 185 includes a perforated stainless steel bottom plate 186, a thin film filter member 187, of paper, Teflon, or the like, an inert porous filter cake material 188 and an upper perforated stainless steel plate 190. The filtering plates which are sealed to the housing wall at edges by spacers of rubber or the like, are positioned intermediate the top and bottom of the housing so as to provide a liquid collecting chamber 191 in which filtered liquid is maintained at a pressure lower than in the chamber 182. The top of the housing 187 is closed by a lid 192 having a conventional interrupted edge lock with turning handles and an O-ring edge sealing arrangement. A liquid discharge opening 193 is provided in the top of the lid 192. The intake 183 is provided with a nozzle 194 to clean or clear the filter of solids continuously.

Referring to FIG. 13 there is illustrated a flow diagram showing the further processing of the material delivered from the main ore conveying conduit, indicated by the letter M in each of the figures. The equipment indicated may be conventional processing equipment which is located at the surface and enables the material to be processed for extraction or separation of metals and metal compounds with the gangue immediately returned to the underwater location where it has been found.

Hydrogen is removed from the material delivered at M in FIGS. 3, 4, 7, 8 and 10 and at X in FIGS. 8, 9 and 10, by means of conventional gas accumulators. Chlorine in solution ($Cl_2$) is retained in the conduit device outputs or surface plant inputs since it continues to serve as an oxidizing agent, together with other oxidizing agents, during processing. However, hydrochloric acid is needed to neutralize the high pH inputs such as from M in FIG. 3 and from X in FIG. 8 and to neutralize the waste products to pH=7 before returning such products to the sea. For this purpose hydrogen from inputs just listed is blended in the presence of catalysts or combusted with chlorine in the HCl generator, using water as a dilutant. The chlorine for this purpose is removed from M and X outputs, in FIGS. 3 and 8, respectively, using a modified gas accumulator (with agitators and heat to evaporate and remove $Cl_2$ from the solutions).

Oxidation of mineral components of the ore to form soluble metal compounds, such as, simple and complex chlorides, chlorites, chlorates, perchlorates, chloro metal acids, such as, chlorauric acid or chloroplantinic acid, sodium and potassium chloro metals, such as sodiumbromoaurate or potassiumchloroaurate, etc.; and finally the most insoluble of minerals are oxidized to metal fluorides. All of this takes place during electrolytic oxidation in the conduit devices. Where this has not been done, as in the case of outputs from M in FIGS. 4 and 8, these outputs are fed into a surface plant version of the device shown in FIG. 9 (fed into main conduit M in FIG. 9). The chief oxidizing agents, also produced by electrolysis, which oxidize (ionize or make soluble ore minerals wherein the metal atoms lose electrons to become M+ ions) the mineral components of the ore are the following: where the cathode and anode are not isolated, that is M in FIG. 3 and X in FIG. 8:

$NaClO$ $NaClO_2$ $NaClO_3$ $NaClO_4$ where the cathode and anode are isolated:

Cl (nascent)

$Cl_2$

F (nascent)

$F_2$ $HClO$ $HClO_2$ $HClO_3$ $HClO_4$

Br

When all of the valuable mineral components have become oxidized or nearly so, they are fed into the ion exchange unit where the ore and remaining solution oxidants are blended, so as to dissolve any residual valuable metal ore components. When this has been done, the gangue residue of the ore is removed from the ion exchange unit, washed, filtered, neutralized to pH=7 and disposed of as waste. The liquid taken from the top of the filter comprises sea water solution and metal solutes. The solution and solutes are then blended with caustic soda (NaOH solution from X in devices FIGS. 7 and 9). This fully precipitates the metal solutes to either oxides or hydroxides. The latter are washed and filtered, dried, roasted, smeltered and refined to obtain the metals.

We claim:

1. A system for recovering metals and metal bearing materials from underwater areas comprising a material collecting vehicle and means for moving the vehicle over the surface on the bottom of the underwater area, said vehicle having means for gathering material on said surface and directing it into the vehicle, a conduit leading from said vehicle to the surface of the water, means on said vehicle to direct the gathered material into said conduit, said conduit having associated means for obtaining by electrolysis of the liquid surrounding said vehicle and said conduit decomposition products at least part of which constitute propellant gas for feeding into said conduit for use in mixing with and transporting to the surface the gathered material which is directed into the conduit.

2. Apparatus for collecting mineral bearing ore materials from the floor of the sea or similar fluid covered areas comprising a vehicle adapted to be moved about on said floor area, a conduit extending from said vehicle to the surface and forming a passageway for conveying collected material, said vehicle having means for gathering ore material on said floor area and feeding the same mixed with fluid, into the bottom end of said conduit, and means for decomposing portions of the surrounding fluid and supplying the resultant products at least a part of which are gaseous to the conduit for use as a propellant for conveying upwardly of the conduit the material fed into the passageway.

3. Apparatus for collecting mineral bearing ore materials as set forth in claim 2, and said vehicle having means for crushing the ore materials to predetermined fineness and for directing the crushed ore material into the bottom end of said conduit.

4. Apparatus for collecting mineral bearing ore materials as set forth in claim 2, and said means for decomposing portions of the surrounding fluid being operative to provide products which will serve as a propellant for the material fed into the conduit passageway and also products which will react with mineral components of said material so as to oxidize and reduce the same to soluble minerals and mineral compounds.

5. Apparatus for collecting mineral bearing ore materials as set forth in claim 2 and said means for decomposing portions of the surrounding material comprising one or more electrolysis units associated with said conduit for converting said surrounding fluid into component products which are added to the material in said passageway to lighten the weight of the same and serve to aid in the movement of the material upwardly in the conduit.

6. Apparatus for collecting mineral bearing ore materials as set forth in claim 2 and said conduit comprising link forming tubular sections which are connected by hollow ball and socket type joints to form an articulated chain.

7. Apparatus for collecting mineral bearing ore materials as set forth in claim 6 and said means for decomposing portions of the surrounding fluid being incorporated in one or more of said ball and socket joints and operating on portions of the surrounding fluid which are mixed with the gathered material fed into said conduit from said vehicle.

8. Apparatus for collecting mineral bearing ore materials as set forth in claim 7 and said means for decomposing portions of the surrounding fluid being an arc type electrolysis unit.

9. Apparatus for collecting mineral bearing ore materials as set forth in claim 2 and said conduit having a jacket of material which will add buoyancy to the conduit.

10. Apparatus for collecting mineral bearing ore materials as set forth in claim 6, and said conduit sections having chambers for receiving a gaseous material to render the conduit buoyant.

11. Apparatus for collecting mineral bearing ore materials as set forth in claim 6 and electrodes forming an electrolysis unit mounted in said hollow joints.

12. Apparatus for collecting mineral bearing ore materials as set forth in claim 2 and said means for decomposing portions of the surrounding fluid comprising an electrolysis unit mounted on said conduit unit and having an inlet for the surrounding fluid and a passageway communicating with the material conveying passageway therein for supplying to the material being conveyed propellant forming gaseous products derived from the surrounding fluid.

13. Apparatus for collecting mineral bearing ore materials as set forth in claim 2, and said means for decomposing portions of the surrounding fluid comprising one or more electrolysis devices associated with said conduit for obtaining from the surrounding fluid products which will serve as a propellant for the material fed into the conduit passageway and also products which will react with mineral components of said material so as to convert the same to soluble minerals and mineral compounds.

14. An apparatus for collecting mineral bearing ore materials from the floor of the sea or other underwater locations comprising a vehicle-like device adapted to be moved over the surface of the underwater floor area, a conduit connected to said device and leading upwardly toward the surface of the water which provides a passageway for conveying material collected by said device, and said device having means for gathering material on the floor area, means for separating ore from the gangue and for directing the ore mixed with water into said conduit.

15. An apparatus as set forth in claim 14, and said vehicle-like device having power drive means for moving the same over the surface of the underwater floor area.

16. An apparatus as set forth in claim 14, and the means for separating ore from the gangue comprising a cyclone separator and associated valves for controlling the flow of the material and returning gangue to the floor area.

17. An apparatus as set forth in claim 14, and the means for separating ore from the gangue comprising a cyclone separator and an automatic valve controlling the discharge of gangue for return to the floor area.

18. An apparatus as set forth in claim 114, and said vehicle-like device having means for collecting ore bearing materials which includes means for loosening embedded material and directing it into said vehicle-like device.

19. An apparatus as set forth in claim 18, and said means for loosening embedded material including fluid jets which are directed into the embedded material.

20. An apparatus as set forth in claim 14, and said conduit having means associated herewith for reacting with the surrounding fluid to produce gaseous products which are added to the material being conveyed so as to aid in propelling the material upwardly in the conduit.

21. An apparatus as set forth in claim 20, and said means for reacting with the surrounding fluid comprising an electrolysis device which will produce gaseous products for propelling the material and also products for reacting with the mineral components of the material being conveyed to oxidize and reduce the same to soluble minerals and mineral compounds.

22. Apparatus for collecting mineral bearing ore materials as set forth in claim 2, and said means for decomposing portions of the surrounding fluid comprising an electrolysis arrangement in which the conduit shell constitutes one of the electrodes.

23. Apparatus for collecting mineral bearing ore materials as set forth in claim 22, and said means for decomposing portions of the fluid which is drawn into the conduit comprising an electrolysis arrangement in which the conduit shell serves as one of the electrodes, a divider means separating the passageway in the conduit into at least two axially extending passageways, and an electrode in the innermost passageway.

24. Apparatus for collecting mineral bearing ore materials as set forth in claim 23, and means associated with said conduit for transferring gaseous products from the outermost to the innermost axial passageway.

25. Apparatus for collecting mineral bearing ore materials as set forth in claim 22, and said means for decomposing portions of the fluid which is drawn into the conduit comprising an electrolysis arrangement in which the electrodes are in the form of separated plate members extending radially within the conduit.

26. Apparatus for collecting mineral bearing ore materials as set forth in claim 22, and said means for decomposing portions of the fluid which is drawn into the conduit comprising an electrolysis arrangement in which the electrodes are in the form of concentrically disposed spaced tubular members.

27. Apparatus for collecting mineral bearing ore materials as set forth in claim 12, and said electrolysis unit comprising an elongate housing forming an electrolysis chamber, said plate-like electrodes mounted therein, said housing having a pressure valve controlled inlet for the surrounding fluid and a valve controlled product outlet passageway communicating with the material conveying passageway.

28. Apparatus for collecting mineral bearing ore materials as set forth in claim 2, and said conduit having its discharge end connected to a pressure differential filter which comprises a lower compartment with an inlet opening for receiving the material from the conduit and an upper compartment separated by filter elements for separating solid material from the liquid, the lower compartment having a discharge opening for the solid material and the upper compartment having a discharge opening for the liquid material.

29. A method of recovering metals and metal bearing materials from underwater areas which comprises collecting mineral bearing ore materials from the areas and delivering the collected materials mixed with portions of the surrounding liquid material to the receiving end of a conduit leading to the surface, decomposing portions of the liquid by electrolysis or electric arc and obtaining thereby gaseous products and oxidizing products, delivering the products thus obtained into the conduit and mixing the same with the collected materials, whereby the gaseous products increase the buoyancy of the conduit and the oxidizing products convert insoluble metal compounds to soluble metal ions and radicals for subsequent separation from undesired solid material and recovery of desired metals and/or metal compounds.

References Cited
UNITED STATES PATENTS

| 2,003,779 | 6/1935 | Yedd | 299—9 |
| 2,144,743 | 1/1939 | Schulz | 262—2 |
| 2,204,506 | 6/1940 | MacDougall | 204—95 XR |
| 3,010,232 | 11/1961 | Skarel et al. | 299—9 |
| 3,161,438 | 12/1964 | Novak | 299—9 |

JOHN H. MACK, Primary Examiner

A. C. PRESCOTT, Assistant Examiner

U.S. Cl. X.R.

204—149, 278

UNITED STATES PATENT OFFICE
CERTIFICATE OF CORRECTION

Patent No. 3,513,081  Dated May 19, 1970

Inventor(s) Frederick Wheelock Wanzenberg and Fritz Walter Wanzenberg

It is certified that error appears in the above-identified patent and that said Letters Patent are hereby corrected as shown below:

```
Column 2, line 1, "has" should be -- is --
Column 4, line 40, second occurrence of "at"
     should be -- in --
Column 5, line 63, "gasses" should be -- gases --
Column 7, line 25, "seat" should be -- sea --
Column 7, line 73, "seat" should be -- sea --
Column 8, line 51, "new" should be -- few --
Column 10, line 12, "housings" should be -- housing --
Column 14, line 15, "114" should be -- 14 --
```

SIGNED AND SEALED
SEP 15 1970

(SEAL)
Attest:

Edward M. Fletcher, Jr.
Attesting Officer

WILLIAM E. SCHUYLER, JR.
Commissioner of Patents